(12) United States Patent
Seth et al.

(10) Patent No.: US 8,034,431 B2
(45) Date of Patent: Oct. 11, 2011

(54) INTERMITTENTLY BONDED FIBROUS WEB LAMINATE

(75) Inventors: Jayshree Seth, Woodbury, MN (US); Leigh E. Wood, Woodbury, MN (US); Ronald W. Ausen, St. Paul, MN (US); Randall L. Alberg, Maplewood, MN (US); Dennis L. Becker, Vadnais Heights, MN (US); Katherine A. S. Graham, Roseville, MN (US); Byron M. Jackson, Forest Lake, MN (US); Janet A. Venne, Roseville, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 566 days.

(21) Appl. No.: 11/339,022

(22) Filed: Jan. 25, 2006

(65) Prior Publication Data

US 2007/0172628 A1    Jul. 26, 2007

(51) Int. Cl.
*B32B 3/00* (2006.01)
*B32B 27/12* (2006.01)

(52) U.S. Cl. .......... 428/99; 428/100; 428/101; 428/189; 428/190; 442/394; 442/395; 442/397; 442/398

(58) Field of Classification Search .................. 15/209.1, 15/215; 24/442, 452, 306, 444; 156/73.2, 156/85, 252, 256, 291, 292, 160, 196, 148, 156/209, 72; 427/122; 428/100, 120, 131, 428/85, 86, 88, 92, 99, 149, 167, 172, 107, 428/101, 95; 442/149, 79, 86; 604/381, 604/384

See application file for complete search history.

(56) References Cited

U.S. PATENT DOCUMENTS 1,993,470 A    3/1935    Winship
(Continued)

FOREIGN PATENT DOCUMENTS

DE    295 14 350    11/1995
(Continued)

OTHER PUBLICATIONS

Extended European Search Report dated Mar. 31, 2009; PCT/US2007/001503.

*Primary Examiner* — Angela Ortiz
*Assistant Examiner* — Jennifer Steele
(74) *Attorney, Agent, or Firm* — Kathleen B. Gross; Kenneth B. Wood

(57) ABSTRACT

There is provided a laminate of a thermoplastic backing to a fibrous web. This laminate, for example, could be used as a loop laminate for use in a hook and loop fastening system or an intermittently bonded elastic fibrous laminate. The laminate comprises a thermoplastic backing layer, having a first face and a second face. The backing layer has a plurality of projections extending from at least the first face of the backing. A fibrous web is attached to the backing at the location of at least some of the projections. The thermoplastic material of the backing, at the location of the projections, penetrates into the fibrous web encapsulating at least in part fibers of the fibrous web. The fibrous web preferably penetrates into at least some of the projections. The fibrous web is generally not attached, or very lightly attached, to the backing layer over at least some portion of the distance between adjacent projections. This allows for a low cost fibrous web laminate that can be directly extrusion formed with a backing without compromising the fibrous web's performance between the attached projections.

36 Claims, 7 Drawing Sheets

U.S. PATENT DOCUMENTS

| | | | |
|---|---|---|---|
| 3,387,069 A | 6/1968 | Stohr | |
| 3,397,428 A | 8/1968 | Donald | |
| 3,398,431 A | 8/1968 | Corbett | |
| 3,448,183 A | 6/1969 | Chisholm | |
| 3,485,912 A | 12/1969 | Schrenk et al. | |
| 3,756,758 A | 9/1973 | Prall | |
| 3,855,045 A | 12/1974 | Brock | |
| 3,855,046 A | 12/1974 | Hansen | |
| 3,932,090 A | 1/1976 | Brumlik | |
| 4,189,809 A | 2/1980 | Sotos | |
| 4,197,069 A | 4/1980 | Cloeren | |
| 4,247,237 A | 1/1981 | Brown | |
| 4,426,344 A | 1/1984 | Dinter et al. | |
| 4,492,549 A | 1/1985 | Rasmussen et al. | |
| 4,525,407 A | 6/1985 | Ness | |
| 4,533,510 A | 8/1985 | Nissel | |
| 4,536,362 A * | 8/1985 | Donaldson | 264/173.17 |
| 4,761,318 A | 8/1988 | Ott | |
| 4,787,897 A | 11/1988 | Torimae | |
| 4,816,316 A | 3/1989 | Robbins, III | |
| 4,839,131 A | 6/1989 | Cloeren | |
| 4,865,889 A | 9/1989 | Boyse | |
| 5,032,122 A | 7/1991 | Noel | |
| 5,062,751 A | 11/1991 | Liebel | |
| 5,120,484 A | 6/1992 | Cloeren | |
| 5,156,793 A | 10/1992 | Buell | |
| 5,167,897 A | 12/1992 | Weber | |
| 5,209,282 A | 5/1993 | Franco et al. | |
| 5,232,777 A | 8/1993 | Sipinen | |
| 5,256,231 A | 10/1993 | Gorman | |
| 5,318,555 A | 6/1994 | Siebers | |
| 5,326,612 A * | 7/1994 | Goulait | 428/100 |
| 5,330,820 A | 7/1994 | Li | |
| 5,354,597 A | 10/1994 | Capik et al. | |
| 5,422,172 A | 6/1995 | Wu | |
| 5,429,856 A | 7/1995 | Krueger | |
| 5,462,708 A | 10/1995 | Swenson et al. | |
| 5,468,428 A | 11/1995 | Hanschen et al. | |
| 5,501,675 A | 3/1996 | Erskine | |
| 5,547,531 A | 8/1996 | Allen | |
| 5,592,690 A | 1/1997 | Wu | |
| 5,595,567 A | 1/1997 | King | |
| 5,614,281 A * | 3/1997 | Jackson et al. | 428/100 |
| 5,614,283 A | 3/1997 | Potnis | |
| 5,635,275 A | 6/1997 | Biagioli | |
| 5,635,276 A | 6/1997 | Biagioli | |
| 5,681,302 A | 10/1997 | Melbye et al. | |
| 5,683,787 A | 11/1997 | Boich | |
| 5,699,593 A | 12/1997 | Jackson | |
| 5,702,798 A | 12/1997 | Sugita | |
| 5,733,628 A | 3/1998 | Pelkie | |
| 5,762,643 A | 6/1998 | Ray | |
| 5,783,014 A | 7/1998 | Biagioli | |
| 5,800,760 A | 9/1998 | Takizawa | |
| 5,804,021 A | 9/1998 | Abuto | |
| 5,840,412 A | 11/1998 | Wood et al. | |
| 5,861,074 A | 1/1999 | Wu | |
| 5,888,607 A * | 3/1999 | Seth et al. | 428/92 |
| 5,891,549 A | 4/1999 | Beretta et al. | |
| 5,974,635 A | 11/1999 | Murasaki | |
| 5,976,665 A | 11/1999 | Hansson | |
| 5,981,027 A | 11/1999 | Parellada | |
| 6,001,460 A | 12/1999 | Morman | |
| 6,027,485 A | 2/2000 | Matsushita | |
| 6,069,097 A | 5/2000 | Suzuki | |
| 6,106,922 A | 8/2000 | Cejka | |
| 6,150,005 A | 11/2000 | Williams | |
| 6,203,645 B1 | 3/2001 | Gilpatrick | |
| 6,203,880 B1 | 3/2001 | Gilpatrick | |
| 6,221,483 B1 | 4/2001 | Hilston | |
| 6,242,074 B1 | 6/2001 | Thomas | |
| 6,245,401 B1 | 6/2001 | Ying et al. | |
| 6,280,824 B1 | 8/2001 | Insley et al. | |
| 6,303,208 B1 | 10/2001 | Pelkie | |
| 6,313,372 B1 | 11/2001 | Suzuki | |
| 6,329,308 B1 | 12/2001 | Kenmochi | |
| 6,447,875 B1 | 9/2002 | Norquist | |
| 6,511,742 B1 | 1/2003 | Muessig | |
| 6,514,412 B1 | 2/2003 | Insley | |
| 6,537,935 B1 | 3/2003 | Seth | |
| 6,537,936 B1 | 3/2003 | Busam | |
| 6,546,693 B2 | 4/2003 | Wycech | |
| 6,582,642 B1 | 6/2003 | Buzzell et al. | |
| 6,589,638 B1 | 7/2003 | McCormack et al. | |
| 6,604,264 B1 * | 8/2003 | Naohara et al. | 24/444 |
| 6,623,587 B1 | 9/2003 | Muller | |
| 6,640,114 B2 | 10/2003 | Bae | |
| 6,648,865 B1 | 11/2003 | Stiehl | |
| 6,649,548 B1 | 11/2003 | Shawver | |
| 6,652,502 B2 | 11/2003 | Bast | |
| 6,667,425 B1 | 12/2003 | Stiehl | |
| 6,669,887 B2 * | 12/2003 | Hilston et al. | 264/173.15 |
| 6,752,889 B2 | 6/2004 | Insley et al. | |
| 6,808,789 B2 | 10/2004 | Pelkie | |
| 6,822,134 B1 | 11/2004 | Stiehl | |
| 7,048,984 B2 | 5/2006 | Seth et al. | |
| 7,182,992 B2 | 2/2007 | Ausen et al. | |
| 7,241,483 B2 | 7/2007 | Ausen et al. | |
| 7,678,316 B2 | 3/2010 | Ausen et al. | |
| 2002/0125605 A1 * | 9/2002 | Lacey et al. | 264/167 |
| 2002/0137418 A1 | 9/2002 | Seth | |
| 2003/0003833 A1 | 1/2003 | Kurihara | |
| 2003/0084996 A1 | 5/2003 | Alberg | |
| 2003/0085485 A1 | 5/2003 | Seidel et al. | |
| 2003/0087059 A1 * | 5/2003 | Jackson et al. | 428/100 |
| 2003/0104192 A1 | 6/2003 | Hester | |
| 2003/0105446 A1 | 6/2003 | Hutson | |
| 2003/0111767 A1 | 6/2003 | Gorman | |
| 2003/0181120 A1 | 9/2003 | Wu | |
| 2003/0203155 A1 | 10/2003 | Kobe et al. | |
| 2004/0068848 A1 | 4/2004 | Ausen et al. | |
| 2004/0121687 A1 | 6/2004 | Morman | |
| 2004/0166756 A1 | 8/2004 | Kurihara | |
| 2004/0178544 A1 | 9/2004 | Jackson | |
| 2004/0180186 A1 | 9/2004 | Jackson | |
| 2005/0060849 A1 | 3/2005 | Vanbenschoten et al. | |
| 2005/0136213 A1 | 6/2005 | Seth | |
| 2005/0170157 A1 * | 8/2005 | Armela et al. | 428/196 |
| 2006/0147686 A1 | 7/2006 | Ausen et al. | |

FOREIGN PATENT DOCUMENTS

| | | |
|---|---|---|
| DE | 201 04 988 | 10/2001 |
| EP | 0160857 | 11/1985 |
| EP | 0353064 | 1/1990 |
| EP | 0 895 731 | 2/1999 |
| EP | 1078582 | 2/2001 |
| JP | 6293067 | 10/1994 |
| JP | 8187113 | 7/1996 |
| JP | 13-226866 | 8/2001 |
| KR | 83-1833 | 2/1991 |
| WO | WO 0009057 | 2/2000 |
| WO | WO 0154900 | 2/2001 |
| WO | WO 03051782 | 6/2003 |
| WO | WO 2006/115985 A1 | 11/2006 |

* cited by examiner

INTERMITTENTLY BONDED FIBROUS WEB LAMINATE

BACKGROUND AND SUMMARY

The present invention relates to a laminate such as could be used as a loop material for a hook and loop fastener having at least one sheet of flexible fibrous web material intermittently extrusion bonded to a structured backing, which backing is generally a film. The invention further relates to methods for producing these laminates.

Fibrous laminates for use as loops and the like formed by lamination of nonwovens to films are known. Such laminates are used often in disposable garments and articles where a fibrous surface is desired. To create a loftier fibrous surface the fibrous material is often intermittently bonded to the backing. With elastic laminates this is desired so as to allow the laminate to more easily extend. For loop laminates intermittent bonding is desired to keep the fibrous material open for attachment of a suitable hook. For example, in U.S. Pat. No. 5,032,122 a backing of orientable material is provided in a dimensionally unstable state. A plurality of filaments are secured to the backing at spaced, fixed regions along each of the filaments. The fixed regions define between each pair of fixed regions, an unsecured catching region. The orientable material recovers along one direction to its dimensionally stable state thereby shirring the filaments at the catching regions to form fibrous elements projecting from the backing between the fixed regions. This is used as a loop fabric.

U.S. Pat. No. 5,547,531 describes forming a loop by a method comprising the steps of providing a first lamina comprising an elastomeric, pressure-sensitive adhesive film having a first adhesive surface and a second adhesive surface opposed to said first adhesive surface; a relaxed orientation and an elongated orientation; stretching said first lamina from said relaxed orientation to said elongated orientation; contacting a second lamina comprising a nonwoven web with said first surface of said first lamina in said elongated orientation, thereby directly joining said second lamina and said first lamina to form a laminate; and relaxing said first lamina such that said second lamina is shirred to form catching regions capable of entangling the hooks of a complementary male fastening component.

U.S. Pat. No. 5,595,567 also uses a nonwoven web, which is preferably joined with a backing while the backing is in its elongated unstable orientation. Construction bonds form a bond pattern joining the nonwoven web to the backing. When the backing is contracted from its elongated orientation to its relaxed orientation, the unsecured regions of the nonwoven web become shirred and extend outwardly from the backing to form catching regions that are capable of entangling the engaging elements of a complementary male fastening component.

U.S. Pat. No. 5,256,231 describes a method of providing a sheet of loop material adapted to be cut into pieces to form loop portions for fasteners of the type comprising releaseably engageable hook and loop portions and incorporated into items such as disposable garments or diapers. The sheet of loop material includes a sheet of longitudinally oriented fibers having anchor portions and arcuate portions projecting in one direction away from the anchor portions, and a layer of thermoplastic backing material extruded onto the anchor portions to bond to the anchor portions forming at least a portion of a backing for the loop material.

BRIEF DESCRIPTION OF THE INVENTION

The invention is directed at a laminate of a thermoplastic backing to a fibrous web. This laminate, for example, could be used as a loop laminate for use in a hook and loop fastening system or an intermittently bonded elastic fibrous laminate. The laminate comprises a thermoplastic backing layer, having a first face and a second face. The backing layer has a plurality of projections extending from at least the first face of the backing. A fibrous web is attached to the backing at the location of at least some of the projections. The thermoplastic material of the backing, at the location of the projections, penetrates into the fibrous web encapsulating at least in part fibers of the fibrous web. The fibrous web preferably penetrates into at least some of the projections. The fibrous web is generally not attached, or very lightly attached, to the backing layer over at least some portion of the distance between adjacent projections. This allows for a low cost fibrous web laminate that can be directly extrusion formed with a backing without compromising the fibrous web's performance between the attached projections.

BRIEF DESCRIPTION OF THE DRAWINGS

The present invention is further described in reference to the accompanying drawings, where like reference numerals refer to like parts on several views, and wherein.

DETAILED DESCRIPTION

The invention fibrous web laminate may be formed by providing a thermoplastic backing having a plurality of upstanding projections, then embedding a flexible fibrous web within the thermoplastic material forming the backing at the location of at least some of the projections. This is termed a selective extrusion bonding process. This selective extrusion bonding, at the location of the backing having the projections, is generally due to the greater polymer mass at these locations of the backing. This greater polymer mass allows the polymer to remain fluid-like longer in these regions. This then allows the fibers of the fibrous web to selectively penetrate into the polymer forming the backing at these locations. The fibrous web preferably is embedded within the thermoplastic polymer of the projections themselves but it is possible that the fibrous web is embedded within the backing face opposite the face having projections at the location of projections. This is possible as the greater thermal mass created by the projections will slow cooling of the backing polymer on both faces of the backing, allowing selective bonding by fiber embedding into the polymer on both faces, but fibers of the fibrous web would naturally embed much better on the projection containing face. The fibrous web between the projections is in contact with the backing, but preferably is not bonded or very lightly bonded.

The backing layer can be any layer which can be selectively extrusion bonded to a fibrous web by provided projections. As such the backing layer could be a film, which could be a continuous film, or a discontinuous film or strips or it could be a suitable fiber able to be provided with projections available for selective extrusion bonding in accordance with the invention. Generally the backing would have a plurality of spaced apart projections with intermediate zones of the backing without projections between at least some of the spaced apart projections. For example, a net structure could be extrusion formed that could have projections on the intersecting strands of the net. Some locations in a netting would have projections with intermediate zones of backing material between the projections (e.g. projections on a stand forming the netting). At some locations of the netting there would be no intermediate zones of backing material between projections, but rather the holes of the netting.

Figure 4:
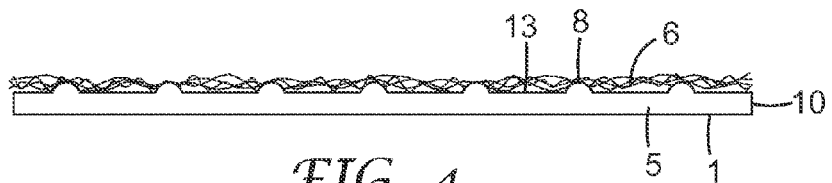
FIG. 4 is a side view of an invention fibrous web laminate in accordance with the present invention.

The backing could be an inelastic and/or elastic thermoplastic material and in some embodiments the projections are formed in part of a different thermoplastic polymer or blend than the backing in areas without the projections. The backing could also be a set of discrete elements. For example, the backing could be a series of discrete elements each provided with more than one projection, preferably three or more projections. If a backing were formed of discrete elements where each was provided with only one projection the discrete elements would tend to pivot away from the fibrous web and not provide any meaningful support. The backing thickness on average between the projections would generally be at least 10 microns, or 20 microns and sometimes thicker than the projections over the backing, such that the backing provides support for the fibrous web between the attachment points created by the projections. The backing is in one embodiment, as shown in FIG. 4, a continuous film 1 having an array of upstanding projections 8 on at least one face of a film backing 5 that is attached to the fibrous web 6. The projections 8 generally are integral to the film backing 5 as they are simultaneously formed, such as during an extrusion process. As such that there are no bond lines or joints between the projections and the backing, just integrally formed projections on a backing. In other words as they are integrally formed the backing material and the material forming the projections is the same where the projections merge with the backing. In some backing formation methods it is possible that the projections at their ends are formed of a different polymer or blend than the backing, in whole of in part, however at the base of the projections the backing and projections are one continuous material.

Figure 1:
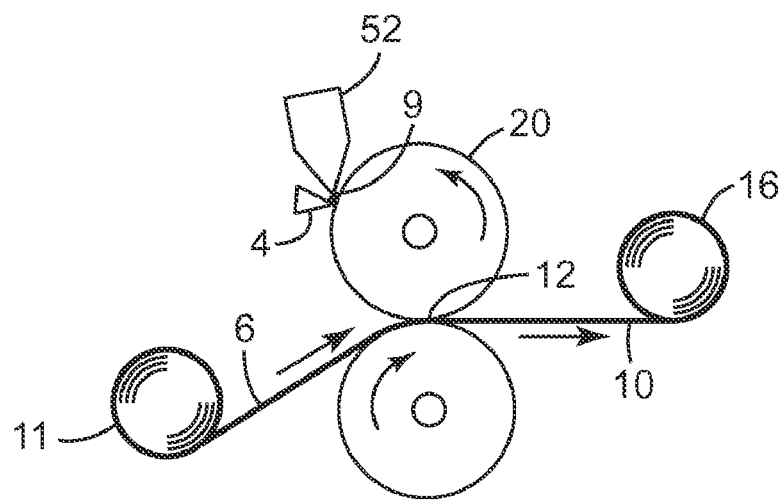
FIG. 1 is a schematic view of a method of forming the invention fibrous web laminate.
Figure 2:
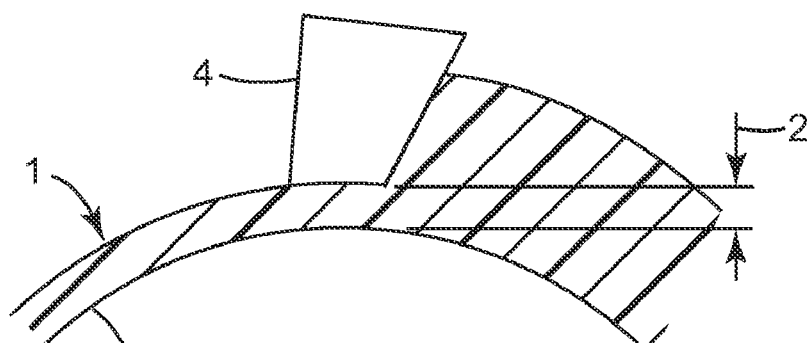
FIG. 2 is a cross-sectional view of a forming tool used to form a precursor film backing used in accordance with the present invention.
Figure 3:
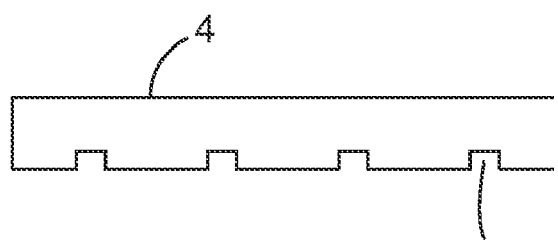
FIG. 3 is a front view of the forming tool of FIG. 2.

The fibrous web laminate can be made by a method such as shown in FIG. 1. An extrusion die 52 extrudes a thermoplastic material forming a film 1 that is formed to comprise a film backing 5 having an array of upstanding projections 8 as shown in FIG. 4. The polymer exiting the die could have projections 8 formed on a forming surface such as forming tool 4, as disclosed in U.S. Patent Publication 2003/111767 A1, the substance of which is incorporated by reference in its entirety. The thermoplastic moldable material is supplied to the forming tool 4 by extrusion to create a film 1 with projections 8 that are replicates of cavities 7 in the tool surface 4, as generally depicted in FIG. 3. The film backing 5 is created by a gap 2 between the forming tool 4 and a backup surface, which as shown in FIG. 2 is a smooth roll 20 surface. Alternatively, these projections 8 could be formed at the die lip directly forming a structured film with a backing having longitudinally extending projections. This generally would be a film having a series of continuous ridges.

This gap 2 can be any suitable width. If a discontinuous backing is desired the gap could also be eliminated in zones by having portions of the forming tool 4 engage the backup surface, such as the roll 20.

Referring again to FIGS. 1, 2, and 4, the film 1 is then joined to a fibrous web 6 in a nip 12, which supplies a degree of pressure to force the fibers of the fibrous web into the film polymer at the location of the projections. The fibrous web 6 can be supplied from a supply form 11, such as a roll, or the fibrous web 6 could be made inline with the film backing 5. The fibrous web 6 is bonded to the film polymer at the location of the projections 8 using primarily the residual heat from the extrusion so as to result in preferential extrusion lamination at the location of the projections 8, with little or no extrusion lamination bonding of the fibrous web to the film 1 in the intermediate portions 13 between the projections 8. The larger mass of thermoplastic material at the projections 8 results in the thermoplastic material in these locations to cool slower, remaining molten or fluid-like for a longer period of time. The fibers of the fibrous web 6 as such can penetrate the thermoplastic material of the film at the location of the projections. The intermediate portions 13 of the film backing are preferably more solidified allowing little or no fiber penetration into the thermoplastic film backing in these portions. The fibrous web as such retains its original loft substantially uniformly in these intermediate portions 13, while maintaining the film backing 5 strength at the location of the projections. The resulting fibrous web laminate 10 is collected in a suitable form such as on a roll 16. The invention extrusion bonding method is in contrast to film and fibrous webs laminated by point bonding using externally applied heat or ultrasonics. With these external heat or sonic point bonding construction methods, the underlying film is weakened at the bond points and the fibrous web is compressed against the backing at the bond points, which also compresses the fibrous web between the bond points. In contrast, with the invention method the fibrous web can be as thick at the bond points as between the bond points. In other words the bond points do not substantially compress the fibrous web. Generally the fibrous web at the bond points is at least 50 percent or 80 percent, or even 90 percent, of the fibrous web thickness between the bond points.

Optionally, the fibrous web laminate 10 after formation, can be length or width oriented as is known in the art. If such orientation were done in a direction transverse to the extent of any extrusion bonds the laminate could elongate between the extrusion bonded points (by points it is meant any discrete bond, which could be a continuous bond running along the laminate) without elongating the extrusion bond points due to their greater thickness and strength. With an inelastic backing this could produce a fibrous web having a basis weight that could not be directly laminated coupled with stable high strength bond points. Low basis weight film nonwoven laminates with lofty fibrous web fabrics are difficult to manufacture directly. This is in part due to the low strength and handleability of low basis weight films and/or nonwovens. It is also in part due to the destructive nature of conventional heat or sonic point bonding techniques, which can weaken and burn through low basis weight laminates or the individual films or fibrous webs forming the laminates. Length orientation, for example, could be between two pairs of nip rollers driven at different speeds, or use of incremental ring rolling techniques. Widthwise elongation could be done by a transverse diverging web path or incremental ring rolling techniques. Further, the fibrous web laminate could also be stretched in the length and transverse directions to provide a biaxially oriented fibrous web laminate.

If the backing is elastic then orientation as described above could be used as a method to activate the elastic fibrous web laminate by weakening the fibrous web between the bonded locations of the elastic backing, allowing the laminate to elastically recover and subsequently easily elongate in the direction and to the extent of the orientation. When an elastic backing recovers, the attached fibrous web would become loftier and have more fibers projecting out from the backing surface. In this case, the fibrous web may be loftier between the bonded locations than at the bonded locations due to elongation and therefore lofting not occurring at the bonded locations. This lofting effect could also be used to create loftier fibrous web laminates for use as loops.

Figure 5:
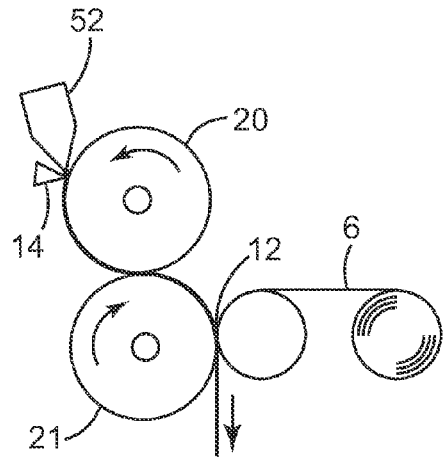
FIG. 5 is a schematic view of a second method of forming the invention fibrous web laminate.
Figure 7:
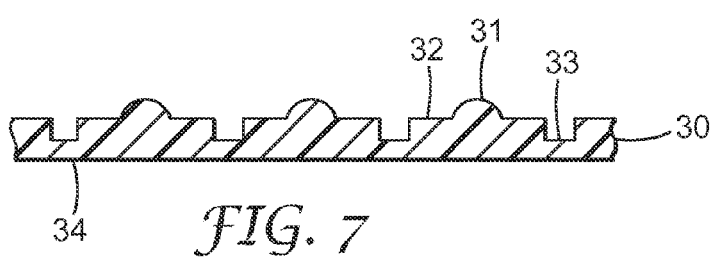
FIG. 7 is a front view of a precursor film backing formed using the forming roll of FIG. 6.

An alternative method for forming a backing is shown in FIG. 5. This is similar to the FIG. 1 embodiment in forming projections using a forming surface however in this case the forming tool 14 surface is smooth and the forming surface 25 is the surface of a forming roll 20. The forming roll 20 is provided with a structured surface 25 that molds the projections 31 on a backing 30 as shown in FIG. 7. The backing 30 as shown is a film having three portions; the projections 31 and intermediate portions 33 and 32 of two different heights or thicknesses. The backing 30 opposite face 34 is a smooth surface made by the forming tool 14 located to provide a gap 2 off the forming roll 20, as shown in FIG. 2. In this case the backing 30 needs to be transferred to a transfer roll 21 prior to being joined to the fibrous web 6 in a nip 12. The projections in this case could be kept in a fluid-like state longer by adjusting the roll temperature to be closer to the melting temperature of the extruded polymer. Transfer roll 21 would preferably not be heated to keep the backing 30 solid. Again discontinuous backing structures could be formed by having no gap along portions of the roll 20. This could form discrete structures, for example, if portions 33 were eliminated by having no gap 2 in these portions of the forming roll surface. If portions 33 were eliminated (by eliminating the gap 2) then the transfer roll would need to pull the discrete elements off the forming surface 25 as there is no continuous backing running in the longitudinal direction, however in this case more than one projection should be provided to secure the discrete elements to the fibrous web. This could be done by having a light bond between the transfer roll and the backing 30, for example using a transfer roll having a surface with adhesion properties to the polymer forming the backing 30.

Figure 8:
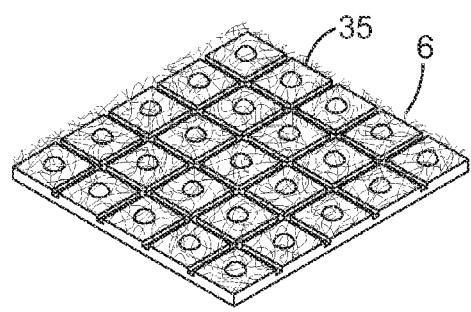
FIG. 8 is a perspective view of an invention fibrous web laminate using the FIG. 7 backing.

FIG. 8 shows the film backing of FIG. 7 joined to a fibrous web 6 at the projections 31. This would likewise be done under pressure, such as in a nip.

Figure 9:
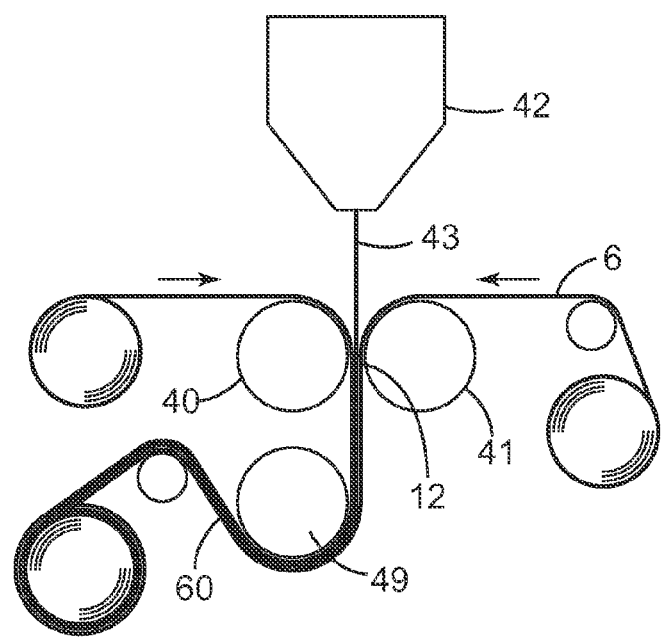
FIG. 9 is a schematic view of a third method of forming the invention fibrous web laminate.

An alternative method for directly forming a film backing for use in the invention, using an extrusion die 42, is schematically illustrated in FIG. 9. The film is extruded from die 42 having a suitable die lip 46 for creating a backing having projections. This projection containing backing 43 is then joined to one or two fibrous webs 6 on one or both faces of the backing 43 under pressure such as in a nip 12. A die lip 46 suitable for this could have forming surfaces similar to those of the forming tool 4, which would generally form ridges running in the direction of the film backing. However a unique process can be used with a conventional multilayer flowstream that allows formation of thermoplastic projections having different bonding characteristics than the thermoplastic material forming the backing between the projections (characteristics other than the thermal state of the polymer at the projections). Generally, this method includes first extruding an initial melt stream 50 along a predetermined flowpath, which preferably can be a multilayer or multi-component melt stream 50 through a die lip 46, such as the die lip insert 10 shown in FIGS. 10 and 11. The predetermined flowpath is preferably one dimensional and continuous along some portion of the flowpath. By one dimensional it is meant that the melt stream could be any one dimensional linear type shape such as a straight line, but it could be a curved line, which curve could intersect itself and form an oval or round form (e.g. a tubular die). In one embodiment the melt stream is delivered from conventional extruders (not shown) through the die 42 having at least one die insert, where the die insert 100 has a profiled non-rectilinear inlet opening 104 as shown in FIG. 12. By non-rectilinear it is meant that the die insert inlet opening as a whole is in a form other than a rectangular shape, however portions of the die inlet openings could be rectilinear in form. The die insert inlet opening 104 interrupts at least portions of the incoming initial melt stream and redirects portions of the interrupted melt stream from the predetermined initial melt stream flowpath form to a flowpath or flowpaths form defined by the die insert inlet opening. The interrupted and redirected melt stream then exits the die insert at outlet 105. The die insert outlet 105 can be similar to the die insert inlet 104 or could converge in the flowpath defined by the die insert from the profiled shape at the die insert inlet opening to a less profiled shape at the die insert outlet 105 where the converged melt stream flowpath approaches the original predetermined melt stream flowpath but is not a rectangular opening. The die insert used for this method causes a redistribution of the initial melt flow stream, at least in part in the cross direction. This also causes at least one layer or portion of the melt stream to redistribute into a multiple of unique possible flowpaths, which generally results in the flow in these flowpaths to have differing flowrates, and hence different levels of melt induced orientation, either in the cross direction of the die insert or in the thickness dimension of the die insert at the die insert outlet or both dimensions. The differing flowrates also create areas with more polymer mass helping to create the projections areas on the film backing. These areas of increased flow would generally be in the areas of peaks 108 and 109 of die insert 104. The melt stream at the die insert outlet is then extruded as a backing having attachment projections created by flow redistribution rather than a profiled forming surface at the die lip outlet 105. However both methods could be used in combination.

Figure 10:
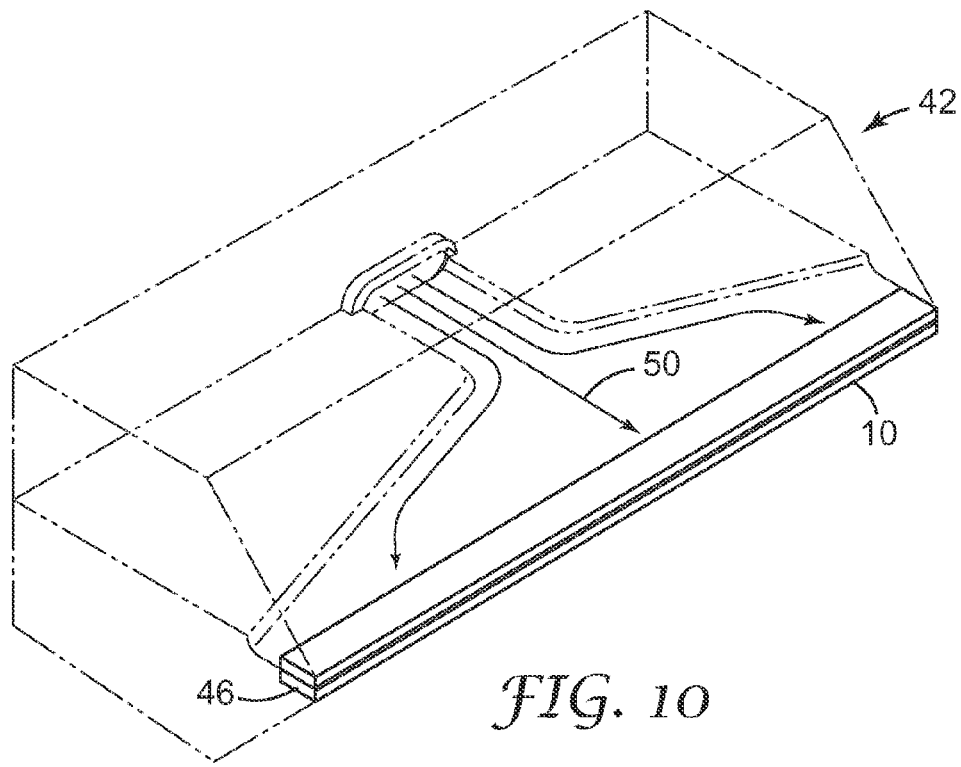
FIG. 10 is a cutaway perspective view of a die used in the method of FIG. 9.
Figure 11:
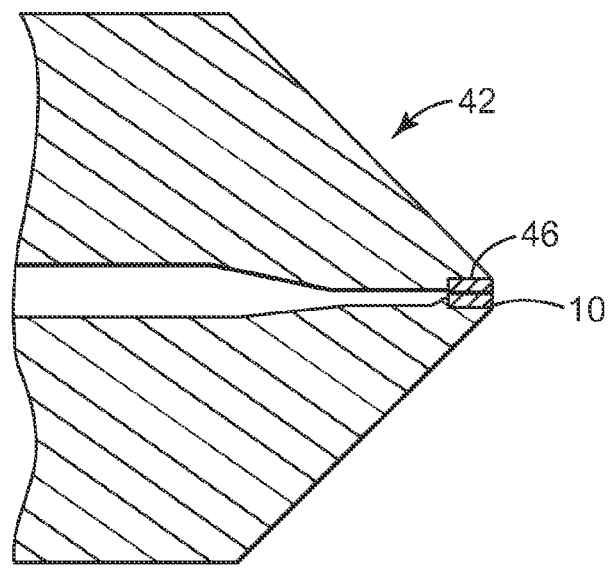
FIG. 11 is a cross-sectional view of the die of FIG. 10 having a die lip insert.
Figure 12:
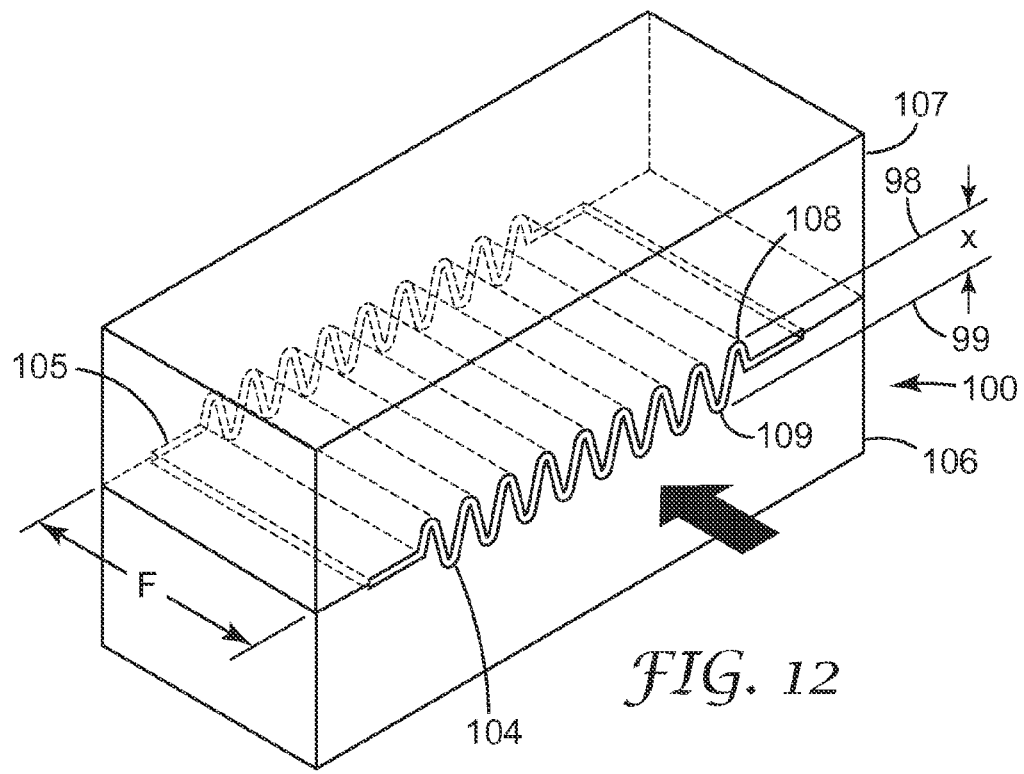
FIG. 12 is a perspective view of a die lip insert from the inlet face.

The insert is shown in the embodiment discussed above as a separate element located within the die as shown in FIGS. 10 and 11. The insert could also be formed integral with the die and/or feedblock in which it is located as long as it has the features described.

Figure 13:
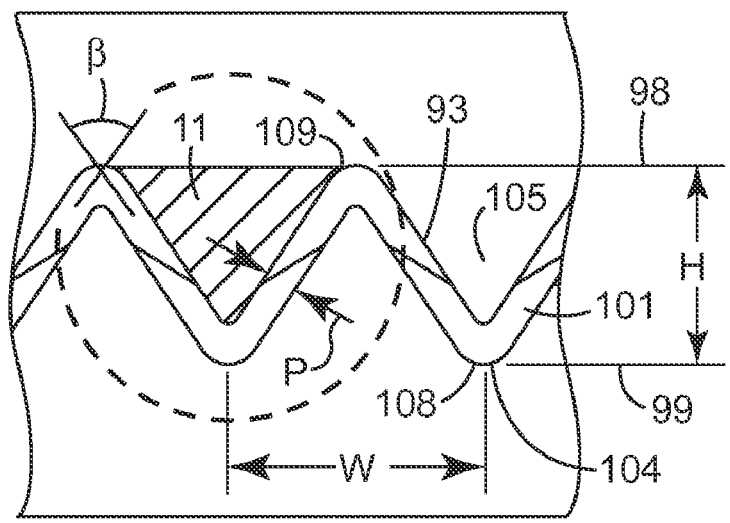
FIG. 13 is a cutaway cross-sectional view of the FIG. 12 die lip insert.
Figure 14:
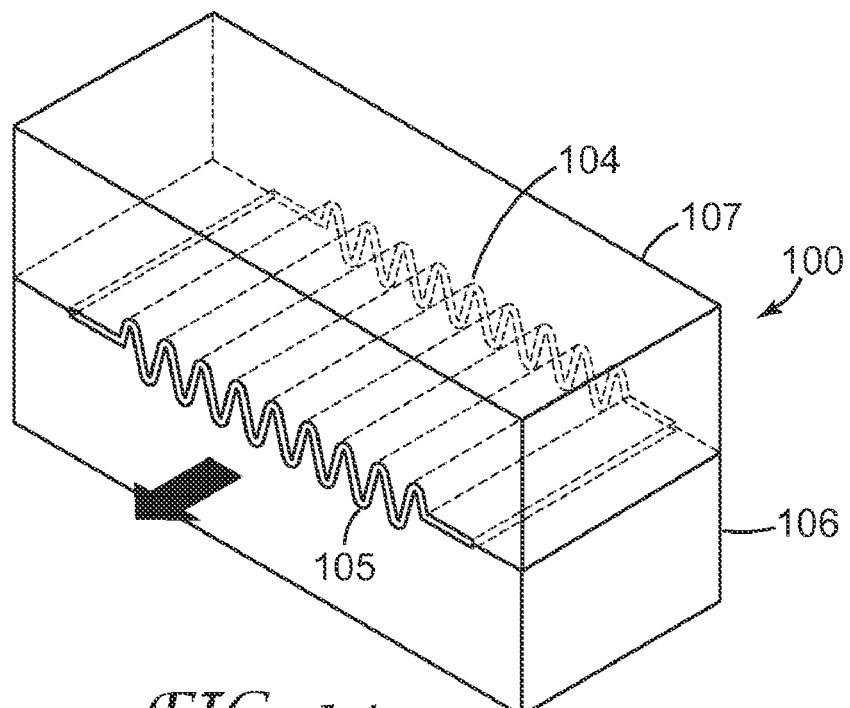
FIG. 14 is a perspective view of a die lip insert of FIG. 12 from the outlet face.

In a preferred embodiment, a profiled die lip as shown for example in FIGS. 12-14 is used in combination with a multilayer melt flow stream. This can result in projections formed of predominately one polymer and the film backing formed predominately of a different polymer by preferential flow redistribution of an outer polymer layer in the projections formed in and by the die lip peaks 108 and 109. A multilayer or multi-component melt stream can be formed by any conventional method. A multilayer melt stream can be formed by a multilayer feedblock, such as that shown in U.S. Pat. No. 4,839,131. A multicomponent melt stream having domains or regions with different components could also be used such as could be formed by use of inclusion co-extrusion die or other known methods, such as that shown in U.S. Pat. No. 6,767, 492.

The melt stream is redirected or redistributed at the insert inlet. The material(s) forming one or more layers or regions of the precursor melt stream are redistributed or redirected in a direction, which can be in the cross direction and/or other dimensions relative to the initial predetermined material flowpaths or forms. The redirected flow is caused at least in part by disruption or interruption of a portion of the material flow at the insert inlet. The insert redistributes portions of the incoming polymer melt flow stream according to the die lip structure.

A die insert can be easily fitted into a conventional die such as a coat hanger die as shown in FIG. 10 and can be readily removed, replaced and cleaned if the die insert is formed of multiple disassemblable components, such as first and second halves as shown in FIGS. 12 and 14. Using multiple die components to form a die insert also allows for more complex flowpaths to be formed by conventional methods such as electron discharge wire machining. Although a two-piece die insert is shown, multiple piece die inserts are also possible allowing for more complex flow channels or flowpaths to be formed in the assembled die insert. The die insert could also be formed in whole or in part with other parts of the die. The flowpaths within the die insert however are preferably substantially continuous and converging, such that they, in at least part of the flowpath within the die, taper in a linear fashion.

The insert inlet region, as shown in FIG. 12, is characterized by having a two dimensional nonplanar structure, which is bounded by a top boundary 98 and a bottom boundary 99. Within the inlet region, defined by the top boundary 98 (or peaks 108) and bottom boundary 99 (or peaks 109), as shown in FIGS. 12 and 13, there are open areas of the insert inlet 100, forming the insert opening 104, separated by closed areas. The open areas are characterized by structures having width dimensions "P", which dimension "P" of course can vary along the open area structure, as can all dimensions. These structures can be substantially continuous openings (such as is shown in FIG. 12), branched openings and/or intermittent openings. The open areas, of at least a portion of an inlet region, generally constitute between 10 to 90 percent of the total area defined between the top and bottom boundaries 98 and 99 in at least a portion of the insert inlet (where the top and bottom boundaries are taken as those bounding the structures in that region of the die insert inlet), or alternatively 20 to 80 percent. Inversely, the closed areas account for 90 to 10 percent of the die insert inlet or alternatively 80 to 20 percent, or greater than 10, 20 or 30 percent up to greater than 50 percent.

With greater levels of closed areas in an insert inlet, larger proportions of material in the initial material flowpath are forced to find alternative flowpaths in order to enter the insert inlet opening 104. Generally, the initial material flowpath cross sectional area can be as large or larger than the insert inlet region, but could be less than the insert inlet region.

The insert inlet opening (or portions thereof) can also be characterized by the ratio of the perimeter of a section of the insert inlet opening to an equivalent rectangular die insert opening (an opening having the same length and same average width dimension P). The ratio of the perimeter of the invention insert inlet opening to the perimeter of an equivalent rectangular insert inlet opening is the perimeter ratio, which can be between 1.1 and 10 or greater than 1.1 or 1.5 or 2.3 but generally less than 8 or 5. Structures with larger perimeters or perimeter ratios are considered more highly structured openings. With more highly structured openings there is generally a more dramatic redistribution of the melt flow from the incoming initial melt flow stream, such as a multilayer or multicomponent flow stream. This is generally due to more possible alternative flowpaths for a given interrupted flowpath. However, with a very large perimeter ratio with a relatively low level of closed areas not much of the melt is significantly redistributed. More closed areas (lower percent open area) leads to more dramatic redistribution of at least some portion of the incoming melt flow stream, particularly when coupled with more highly structured continuous openings or discontinuous openings.

Generally, some material at given points in the melt flow stream is forced to find alternative flow paths due to the closed areas 11, as shown in FIG. 13. With a highly structured opening there are a larger variety of unique possible flow paths in the region bounded by the two boundaries 98 and 99. Material is more easily diverted when there are a large number of possible flow paths that deviate from a mean flow path.

Generally, a die insert inlet opening is characterized by having elements on a given region of the die insert extending between at least a portion of the top boundary 98 to bottom boundary 99 for that region. These elements 93 have a height, which can be less than the distance "H" between the top and bottom boundaries and are generally 10 to 100 percent of "H" or 20 to 90 percent of "H". The elements can extend at an angle $\beta$ from 2 to 90 degrees or 5 to 80 degrees, or 10 to 90 degrees from the mean flowpath extending between the top and bottom boundaries. In FIG. 13 these elements 93 are legs of an oscillating structure but they could be arms or some other structure.

With oscillating inlet openings such as shown in FIGS. 12-14, the elements would constitute a leg 101 between an upper peak 109 and an adjacent lower peak 108 having a height "H". An individual element may extend from the top boundary 98 to the bottom boundary 99 or be an extension of another opening somewhere between the top and bottom boundaries.

Figure 15:
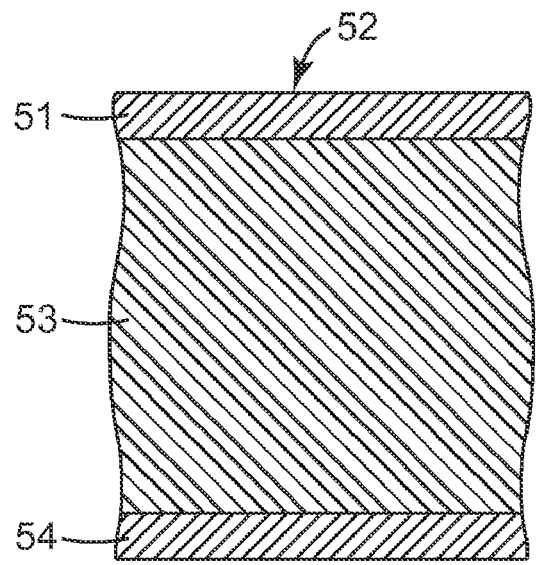
FIG. 15 is a side view of a polymer flowstream with three layers used in accordance with the present invention.
Figure 16:
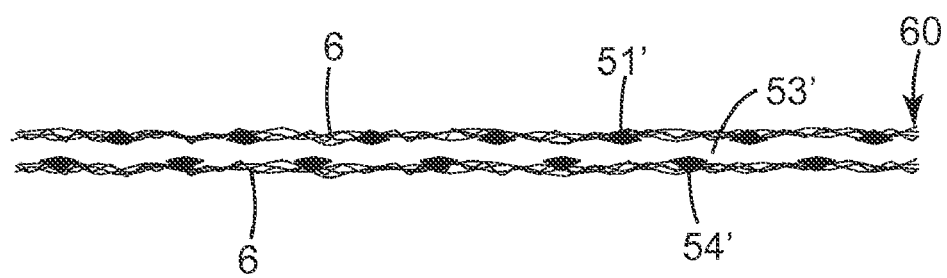
FIG. 16 is a side view of an invention fibrous web laminate using a backing formed by the method of FIG. 9.

FIG. 15 shows a cross-sectional view of a precursor melt stream, which could be fed into the inlet opening of an insert. The FIG. 15 three layer melt stream 52 is characterized by a relatively thick layer 53 and two thinner layers 51 and 54 on the two faces of the thicker layer 53. When this melt stream 52 intercepts with the insert inlet opening 104, the thicker layer 53 is partitioned primarily into the continuous channel of the inlet opening 104, which could form a substantially continuous film backing. A portion of the melt stream thicker layer 53 also gets distributed into the peaks 108 and 109. The outermost melt stream layers 51 and 54 will tend to redistribute into the peaks 108 and 109 formed by the elements 93. The middle layer 53 will tend to evenly partition into the elements 93. The outermost layers 51 and 54 generally will follow the shortest flowpath to an inlet opening, which for the outermost layer 51 would generally be the peaks 109 and for outermost layer 54 peaks 108. Generally, with any given portion of the material flow, the material will tend to flow to the closest opening provided by the inlet 104. At the insert outlet opening 105, as shown in FIG. 14, the three material melt stream layers are in recombined form. The resulting projection containing backing 43 is shown in FIG. 16 after it has been extruded and joined to nonwovens webs 6 forming laminate 60. The middle melt layer 53 forms a continuous film backing 53' and the two outermost layers 51 and 54 forms projections 51' and 54' of the backing 43 as a result of redistribution of the outer layers in the peaks of the die inlet 104. Advantageously, these projections will be formed of a polymer having greater bondability to the fibrous web fabric 6 by virtue of chemical compatibility or lower viscosity (allowing greater penetration of the fibrous web fabric into the material forming projections 51' or 54').

With three or more material layers, the partitioning will be dictated by the relative proportions of the precursor material extrudate layers and the shape of the opening 104 of the insert 100. With an insert having a regularly oscillating opening, the partitioning can result in a backing 43 as shown in FIG. 16 (assuming a coextruded material melt stream with relatively constant thicknesses of the materials across the melt stream). Where the insert openings vary in either width P, angle "β", amplitude "H", wavelength "W" or any combination thereof, as shown in FIG. 13, the partitioning of the material layers will vary but the flow streams will still partition between the peaks 108 and 109 of the insert. The degree of partitioning will also depend on the angle β between legs of the peak and valley openings of the insert. Where the angle β is less than 90 degrees at least one of the layers will tend to be completely partitioned such that it is discontinuously distributed in the extrudate or formed film. This is particularly true where there is an outer flow layer that forms less than 50 percent of the material flow. When the angle β is greater than 90 degrees, the layers tend to partition such that there are no discontinuous layers particularly where a layer is 50 percent or less of the material. Generally the angle β ranges from 170° to 5°, 140° to 10°, 110° to 20°, or 90° to 30°. The opposing peak structures could be regular oscillating curves as shown, step-function curves, or any other variation.

Figure 17:
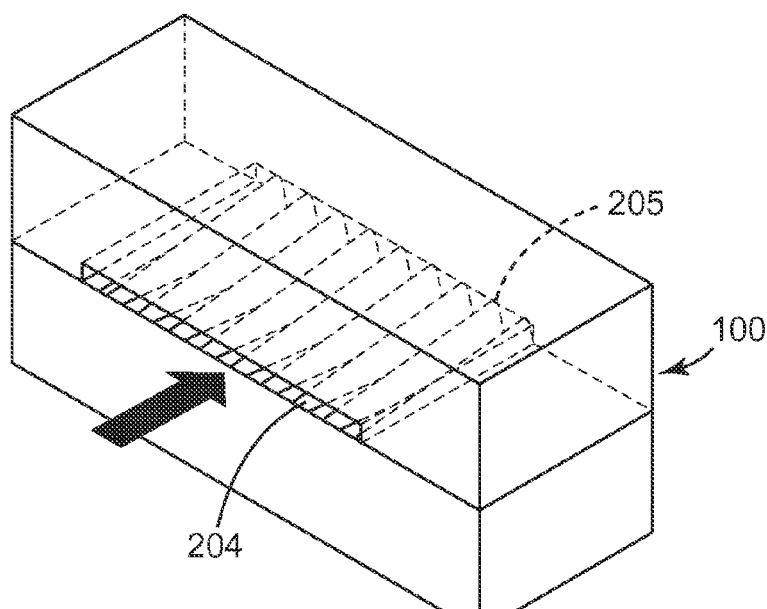
FIG. 17 is a perspective view of a second die lip insert from the inlet face.
Figure 18:
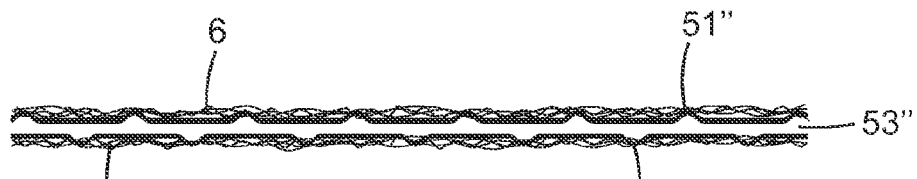
FIG. 18 is a side view of an invention fibrous web laminate using a backing formed by the method of FIG. 9 using the die insert of FIG. 17.

An alternative to the above method of forming a projection containing backing is shown in FIG. 17. In this case the die insert has a more rectangular inlet opening 204 and a structured outlet 205. The result is a film as shown in FIG. 18 having projections similar to those of FIG. 16, however with a multilayer input stream there is no or little cross directional redistribution of the outer layers 51" and 54" and middle layer 53" resulting in a more uniform layered structure in the resulting film.

Figure 19:
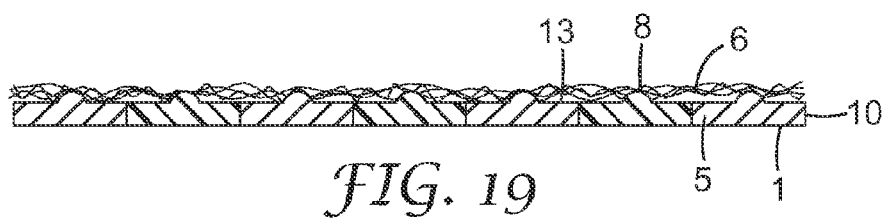
FIG. 19 is a side view of an invention fibrous web laminate with a backing having side by side elastic and inelastic regions.
Figure 20:
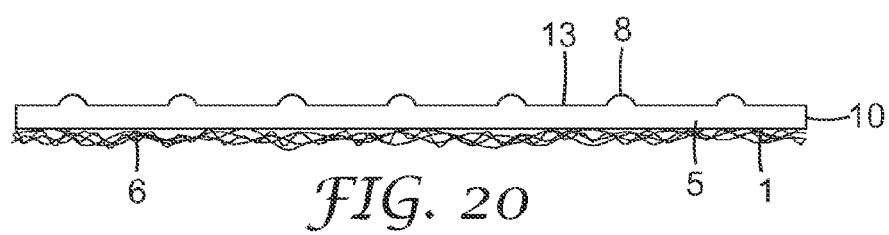
FIG. 20 is a side view of an invention fibrous web laminate with the fibrous web bonded to the face of the backing opposite the face having projections.

The backing formation method could advantageously also be used in combination with other extrusion methods to produce backings having different regions with different properties. For example, with laminated fibrous elastic backings used in disposable garments and articles, such as disposable hygiene products or gowns, it is often desirable to have inelastic regions. These inelastic regions often serve as attachment points to join other elements or to join the elastic fibrous laminate to the article. For example, elastic panels, ear or tabs used on diapers or other hygiene articles often need to have a stable surface for attachment to the article and/or to attach fastener elements, such as mechanical fasteners or adhesives. These inelastic regions of the laminate could be directly formed by providing an inelastic region next to an elastic region on a backing. The inelastic regions and the elastic regions could be formed on a single continuous backing or could be separately formed. Each could be provided with projections or if only one region needs to be intermittently bonded only that region needs to have projections. The inelastic region could be formed of an inelastic thermoplastic polymer or alternatively the inelastic region could be formed of a thermoplastic elastomer continuously bonded to the fibrous web. If a continuous backing is desired this could be done by using conventional side-by-side extrusion methods, coupled with the above exemplary projection-containing backing formation methods. Alternatively the method described for the embodiment of FIGS. 10-12 could be performed further back in the die, for example in the manifold or feedblock area. In this area the width to height ratio of the polymer feedstream is much greater so very few peaks can be provided to redistribute the polymer flow, but larger masses of polymer are redistributed. The redistributed polymer flow is later widened in the die (e.g. a coathanger die) resulting in widening of the redistributed polymer regions. With a multilayer polymer flow the layers could be elastic and inelastic. Also with a multilayer polymer flow this will create a polymer flow at the die lip having large regions with redistributed polymers (e.g. elastic and inelastic), which then could be extruded, to form projections as described above. The inelastic and elastic regions could for example have widths of greater than 5 mm or 10 mm. The side by side elastic and inelastic regions are shown in FIG. 19.

Suitable polymeric materials from which the extruded backings or fibrous webs of the invention can be made include any thermoplastic resins. The thermoplastic resins may include either or both of nonelastomeric or elastomeric thermoplastic polymers. A nonelastomeric thermoplastic polymer is one that is repeatably melt processable and which does not exhibit elastomeric properties at ambient conditions (e.g., room temperature and pressure). As used in connection with the present invention, "nonelastomeric" means that the material will not substantially resume its original shape after being stretched. Further, the nonelastomeric polymers may preferably sustain permanent set following deformation and relaxation, which set is preferably at least about 20 percent or more, and more preferably at least about 30 percent or more of the original length at moderate elongation, e.g., about 50% (for those materials that can even be stretched up to 50% without fracture or other failure). Some examples of nonelastomeric or inelastic thermoplastic compositions that may be used in connection with the present invention include, but are not limited to, polyurethanes, polyolefins (e.g., polypropylenes, polyethylenes, etc.), polystyrenes, polycarbonates, polyesters, polymethacrylates, ethylene vinyl acetate copolymers, ethylene vinyl alcohol copolymers, polyvinylchlorides, acrylate modified ethylene vinyl acetate polymers, ethylene acrylic acid copolymers, nylons, fluorocarbons, etc. Generally polyolefins are preferred, e.g., polypropylene and polyethylene and the like and copolymers and blends thereof.

An elastomeric (or elastic) thermoplastic polymer is one that melts and exhibits elastomeric properties at ambient conditions (e.g., room temperature and pressure). As used in connection with the present invention, "elastomeric" means that the material will substantially resume its original shape after being stretched. Further, the elastomeric polymers may preferably sustain only small permanent set following deformation and relaxation which set is preferably no greater than about 30 percent and more preferably no greater than about 20 percent of the original length at moderate elongation, e.g., about 50%. The elastomeric thermoplastic compositions of the present invention can be both pure elastomers and blends with an elastomeric phase or content that will still exhibit substantial elastomeric properties at room temperature. U.S. Pat. No. 5,501,679 (Krueger et al.) provides some further discussion regarding elastomeric materials that may be considered for use in connection with the present invention.

The elastomeric thermoplastic materials can include one or more elastomeric materials which can be extruded into a backing such as a film or form a film layer or a fiber or the like, which include ABA block copolymers, polyolefin elastomers, polyurethane elastomers, metallocene polyolefin elastomers, polyamide elastomers, ethylene vinyl acetate elastomers, polyester elastomers, or the like. An ABA block copolymer elastomer generally is one where the A blocks are polyvinyl arene, preferably polystyrene, and the B blocks are conjugated dienes specifically lower alkylene diene. The A block is generally formed predominately of monoalkylene arenes, preferably styrenic moieties and most preferably styrene, having a block molecular weight distribution between 4,000 and 50,000. The B block(s) is generally formed predominately of conjugated dienes, and has an average molecular weight of from between about 5,000 to 500,000, which B block(s) monomers can be further hydrogenated or functionalized. The A and B blocks are conventionally configured in linear, radial or star configuration, among others, where the block copolymer contains at least one A block and one B block, but preferably contains multiple A and/or B blocks, which blocks may be the same or different. A typical block copolymer of this type is a linear ABA block copolymer where the A blocks may be the same or different, or multi-block (block copolymers having more than three blocks) copolymers having predominately A terminal blocks. These multi-block copolymers can also contain a certain proportion of AB diblock copolymer. AB diblock copolymer tends to form a more tacky elastomeric film layer. Other elastomers can be blended with a block copolymer elastomer(s) provided that they do not adversely affect the elastomeric properties of the elastic material. A blocks can also be formed from alpha-methyl styrene, t-butyl styrene and other predominately alkylated styrenes, as well as mixtures and copolymers thereof. The B block can generally be formed from isoprene, 1,3-butadiene, ethylene-butylene or ethylene-propylene monomers.

The thermoplastic compositions used in connection with the present invention can also be combined with various additives for desired effect. These include, for example, fillers, viscosity reducing agents, plasticizers, tackifiers, colorants (e.g., dyes or pigments), antioxidants, antistatic agents, bonding aids, antiblocking agents, slip agents, stabilizers (e.g., thermal and ultraviolet), foaming agents, microspheres, glass bubbles, reinforcing fibers (e.g., microfibers), internal release agents, thermally conductive particles, electrically conductive particles, and the like. The amounts of such materials that can be useful in the thermoplastic compositions can be readily determined by those skilled in the art of processing and using such materials.

A multilayer construction can utilize any multilayer or multicomponent film extrusion process such as disclosed in U.S. Pat. Nos. 5,501,675; 5,462,708; 5,354,597 and 5,344,691, the substance of which are substantially incorporated herein by reference. These references teach various forms of multilayer or coextruded elastomeric laminates, with at least one elastic layer and either one or two relatively inelastic layers. A multilayer film, however, could also be formed of two or more elastic layers or two or more inelastic layers, or any combination thereof, utilizing these known multilayer multicomponent coextrusion techniques.

Suitable processes for making nonwoven fibrous webs that may be used in connection with the present invention include, but are not limited to, airlaying, spunbond, spunlace, bonded melt blown webs and bonded carded web formation processes. Fibers can also be formed into suitable fibrous webs by knitting, weaving or forming nettings. The fibrous web could also be formed of discrete non-entangled fibers such as continuous substantially parallel filaments or yarns. Spunbond nonwoven webs are made by extruding a molten thermoplastic, as filaments from a series of fine die orifices in a spinneret. The diameter of the extruded filaments is rapidly reduced under tension by, for example, by non-eductive or eductive fluid-drawing or other known spunbond mechanisms, such as described in U.S. Pat. No. 4,340,563 (Appel et al.); U.S. Pat. No. 3,692,618 (Dorschner et al.); U.S. Pat. Nos. 3,338,992 and 3,341,394 (Kinney); U.S. Pat. No. 3,276,944 (Levy); U.S. Pat. No. 3,502,538 (Peterson); U.S. Pat. No. 3,502,763 (Hartman) and U.S. Pat. No. 3,542,615 (Dobo et al.). The spunbond web is preferably bonded (point or continuous bonding).

The nonwoven web layer may also be made from bonded carded webs. Carded webs are made from separated staple fibers, which fibers are sent through a combing or carding unit which separates and aligns the staple fibers in the machine direction so as to form a generally machine direction-oriented fibrous nonwoven web. However, randomizers can be used to reduce this machine direction orientation.

Once the carded web has been formed, it is then bonded by one or more of several bonding methods to give it suitable tensile properties. One bonding method is powder bonding wherein a powdered adhesive is distributed through the web and then activated, usually by heating the web and adhesive with hot air. Another bonding method is pattern bonding wherein heated calender rolls or ultrasonic bonding equipment are used to bond the fibers together, usually in a localized bond pattern though the web can be bonded across its entire surface if so desired. Generally, the more the fibers of a web are bonded together, the greater the nonwoven web tensile properties.

Airlaying is another process by which fibrous nonwoven webs useful in the present invention can be made. In the airlaying process, bundles of small fibers usually having lengths ranging between 6 to 19 millimeters are separated and entrained in an air supply and then deposited onto a forming screen, often with the assistance of a vacuum supply. The randomly deposited fibers are then bonded to one another using, for example, hot air or a spray adhesive.

Meltblown nonwoven webs may be formed by extrusion of thermoplastic polymers from multiple die orifices, which polymer melt streams are immediately attenuated by hot high velocity air or steam along two faces of the die immediately at the location where the polymer exits from the die orifices. The resulting fibers are entangled into a coherent web in the resulting turbulent airstream prior to collection on a collecting surface. Generally, to provide sufficient integrity and strength for the present invention, meltblown webs must be further bonded such as by through air bonding, heat or ultrasonic bonding as described above.

A web can be made extensible by skip slitting as is disclosed in, e.g., International Publication No. WO 96/10481 (Abuto et al.). If an elastic, extensible laminate is desired, the slits are discontinuous and are generally cut on the web prior to the web being attached to any elastic backing. Although more difficult, it is also possible to create slits in the nonelastic web layer after the nonelastic web is laminated to an elastic backing. At least a portion of the slits in the nonelastic web should be generally perpendicular (or have a substantial perpendicular vector) to the intended direction of extensibility or elasticity (the at least first direction) of the elastic backing layer. By generally perpendicular it is meant that the angle between the longitudinal axis of the chosen slit or slits and the direction of extensibility is between 60 and 120 degrees. A sufficient number of the described slits are generally perpendicular such that the overall laminate is elastic. The provision of slits in two directions is advantageous when the elastic laminate is intended to be elastic in at least two different directions.

A nonwoven web used in connection with the present invention can also be a necked or reversibly necked nonwoven web as described in U.S. Pat. Nos. 4,965,122; 4,981,747; 5,114,781; 5,116,662; and 5,226,992 (all to Morman). In these embodiments the nonwoven web is elongated in a direction perpendicular to the desired direction of extensibility. When the nonwoven web is set in this elongated condition, it will have stretch and recovery properties in the direction of extensibility.

As used herein, the term "fiber" includes fibers of indefinite length (e.g., filaments) and fibers of discrete length, e.g., staple fibers. The fibers used in connection with the present invention may be multicomponent fibers. The term "multicomponent fiber" refers to a fiber having at least two distinct longitudinally coextensive structured polymer domains in the fiber cross-section, as opposed to blends where the domains tend to be dispersed, random, or unstructured. The distinct domains may thus be formed of polymers from different polymer classes (e.g., nylon and polypropylene) or be formed of polymers from the same polymer class (e.g., nylon) but which differ in their properties or characteristics. The term "multicomponent fiber" is thus intended to include, but is not limited to, concentric and eccentric sheath-core fiber structures, symmetric and asymmetric side-by-side fiber structures, island-in-sea fiber structures, pie wedge fiber structures, and hollow fibers of these configurations.

Fibers suitable for forming a fibrous fibrous web can be produced from a wide variety of thermoplastic polymers that are known to form fibers. Suitable thermoplastic fiber forming polymers are selected from polyolefins, polyamides, polyesters, copolymers containing acrylic monomers, and blends and copolymers thereof. Suitable polyolefins include polyethylene, e.g., linear low density polyethylene, high density polyethylene, low density polyethylene and medium density polyethylene; polypropylene, e.g., isotactic polypropylene, syndiotactic polypropylene, blends thereof and blends of isotactic polypropylene and atactic polypropylene; and polybutylene, e.g., poly(1-butene) and poly(2-butene); polypentene, e.g., poly-4-methylpentene-1 and poly(2-pentene); as well as blends and copolymers thereof. Suitable polyamides include nylon 6, nylon 6/6, nylon 10, nylon 4/6, nylon 10/10, nylon 12, nylon 6/12, nylon 12/12, and hydrophilic polyamide copolymers such as copolymers of caprolactam and an alkylene oxide, e.g., ethylene oxide, and copolymers of hexamethylene adipamide and an alkylene oxide, as well as blends and copolymers thereof. Suitable polyesters include polyethylene terephthalate, polybutylene terephthalate, polycyclohexylenedimethylene terephthalate, and blends and copolymers thereof. Acrylic copolymers include ethylene acrylic acid, ethylene methacrylic acid, ethylene methylacrylate, ethylene ethylacrylate, ethylene butylacrylate and blends thereof. The projections are, in a preferred embodiment, formed from a polymer that is compatible with at least some of the fibers forming a fibrous web such that they are capable of autogenously bonding.

Generally, a fibrous web will have a basis weight of from 10 to 100 g/m$^2$, preferably 10 to 50 g/m$^2$ and in some embodiments, comprise at least in part, thermoplastic fibers suitable for autogenously bonding. Generally at least 10 percent of the fibers are of the bondable thermoplastic type, and in specific embodiments are from 20 to 100 percent bondable thermoplastic fibers. The majority of the individual fibers forming the fibrous web are preferably on average 1 to 70 μm in diameter. The backing layer generally has a basis weight of from 15 to 150 g/m$^2$, preferably from 20 to 50 g/m$^2$. If a nonwoven is used, the total nonwoven laminate in a preferred embodiment has a basis weight of from 30 to 300 g/m$^2$, preferably 40 to 100 g/m$^2$.

Preferably, a fibrous loop web should have a relatively low basis weight so that there will be adequate space between the fibers of the loop web for the hook heads of a mating hook fastener to penetrate between open areas of the fibers.

A loop web is preferably comprised of relatively long fibers. The longer the fibers, the easier it is to bond these fibers to each other and to the backing layer projections. If extremely short fibers are used, there may be an excessive number of unbonded loose fibers or partially bonded fibers (e.g., fibers with only one of their ends bonded). Such fibers will be incapable of entangling and holding the hook heads of the hook fastener. The lengths of the fibers in a nonwoven web depend upon the type of process used to make the nonwoven loop web. For instance, if a carded nonwoven web is used, the fibers that comprise such a web can have lengths that can range from about 0.5 inch to about 5 inches (from about 1 cm. to about 13 cm.). Preferably, the fibers are between about 2 inches and about 3 inches (between about 5 cm. and about 8 cm.) long. If, on the other hand, a spunbonded nonwoven web is used, the fibers or filaments of such a web will typically be continuous in length.

Figure 6:
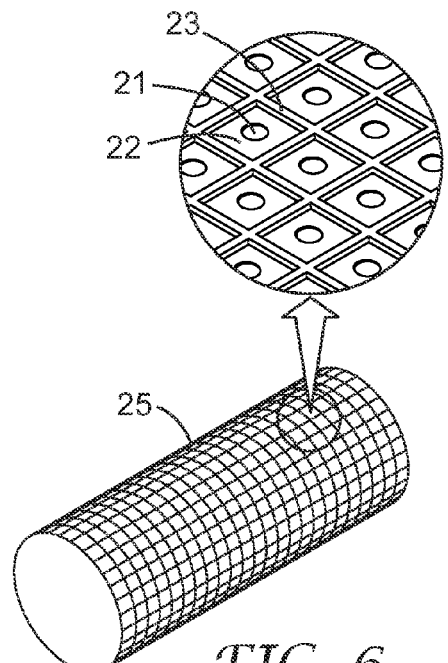
FIG. 6 are perspective views of the FIG. 5 forming roll with an exploded view of the roll surface.

The diameter of the fibers is one factor that determines the strength of a loop web and the engageability with suitable hook heads. A common measure of diameter is known as denier. (Denier is a unit of fineness of a yarn weighing one gram for each 9,000 meters, thus a 100-denier yarn is finer than a 150-denier yarn). Generally, the larger the diameter of the fiber, the stronger the fiber, but the larger the hook head overhang 49 needed to engage the fiber. The maximum fiber diameter that can be used depends in part on the size of the opening between the fibers and the fiber engaging overhang (49) of the hook heads (46) as shown in FIG. 6c. The diameter of the fibers must not be so great that the hook heads are unable to grab and entangle the fibers. Typically, for currently available hook components, the fibers of a nonwoven loop web should have a denier of between about 2 and about 15. Hooks that are substantially smaller could be used with smaller denier fibers such as between about 0.5 and about 15, or less. It is possible that fibers having deniers as low as between about 0.5 and about 1.0, or less, could be used with smaller hook heads. Such fibers may be referred to as "micro denier" fibers.

The amount of inter-fiber bonding between the fibers of a nonwoven loop web determines in part the amount of open area between the fibers available for hook head penetration as well as the nonwoven loop web integrity. The bond sites created by the bonds between the fibers, either internal fiber-to-fiber bonds or point bonds of the web as a whole, will tend to reduce the degree of freedom for the fibers to spread so as to accommodate the hook heads. But increased bond sites will increase web integrity and reduce the number of loose fibers. The degree of inter-fiber bonding depends on the type of nonwoven material used to form the loop and the degree of point bonding used to increase the web integrity. The nonwoven web could be initially unbonded and then later point bonded during the process of manufacturing the laminate, either prior to bonding to the projections or by the bond sites with the projections. The degree of bonding is generally selected to allow the web and/or fibrous web laminate to be of sufficient integrity to be handled in the manufacturing process as well as to provide integrity to the web. The hook heads engage with individual fibers. These individual fibers are bonded or entangled at, at least, two points so that the hook must not easily pull the engaged fiber out during disengagement of the hook fastener, whether the fibrous web is a nonwoven or any other type of fibrous web. Generally with nonwoven fibrous webs, the inter-fiber bonds should occupy less than about 10%, preferably less than about 6%, and most preferably less than about 2.5% of the area of the nonwoven fibrous web. This will assure that the space occupied by the inter-fiber bonds will not interfere with the penetration of the hook heads of the mating hook fastener. If the nonwoven fibrous web material is provided by carding, Rando webs, airlaid webs, spunlace webs, spunbond webs, or the like, the nonwoven fibrous material is preferably not prebonded or consolidated to maximize the open area between the fibers. However, in order to allow preformed webs to be handled, it is necessary on occasion to provide suitable point bonding and the like which should be at a level only sufficient to provide integrity to unwind the preformed web from a roll and into the forming process for creating the invention fibrous web laminate.

Generally, the portion of the fibrous web that is unbonded to the backing projections for a loop laminate, is from 99.5 to 50 percent of the surface area of the backing, providing bonded areas of from 50 to 0.5 percent of the surface area of the nonwoven web, preferably, the overall bonded area of the nonwoven web is from 20 to 2 percent. The bonded areas include those areas of the sheet of fibers bonded to the backing layer projections as well as any prebonded or consolidated areas provided to improve web integrity. The specific bonding portions or areas bonded to the projections of the backing layer generally can be any width; however, preferably are from 0.01 to 0.2 centimeters in its narrowest width dimension (as measure at the base of the projections). Adjacent bonding projections are generally on average spaced from 50 µm to 1000 µm, and preferably 50 µm to 500 µm apart.

In order to maintain the desirable softness of the fibrous web laminate, a film-like backing layer or layers generally has a thickness apart from the projections of from 10 to 300 microns, preferably from 20 to 100 microns providing a soft fibrous laminate. The laminate has sufficient tensile strength in order to be reliably used in continuous manufacturing techniques requiring a dimensionally stable material, generally having a tensile strength of at least 0.5 kg/cm, preferably at least 1.0 kg/cm.

The term "hook" as used herein, is used to designate the engaging elements of the hook fastener. The term "hook" is non-limiting in the sense that the engaging elements may be in any shape known in the art so long as they are adapted to engage a complementary loop material. The hook fastener comprises a base layer having a first surface and a second surface and a plurality of hooks extending from at least the first surface of the base. Each of the hooks preferably comprises a stem supported at one end on the base and an enlarged head positioned at the end of the stem opposite the base. The hook fasteners used with the fibrous web laminate of the present invention can be conventional, commercially available hook materials.

Example 1

A coextruded profiled nonwoven/elastic laminate web was made using apparatus similar to that shown in FIG. 9. Two extruders were used to produce a two layer extrudate consisting of a first 'A' polypropylene layer and a second 'B' elastic layer. The first layer was produced with a polypropylene homopolymer (99% 3762, 12 MFI, Atofina Inc., Houston, Tex.) and 1% polypropylene-based red color concentrate. The second elastic layer was produced with a blend of 70% KRATON G1657 SEBS block copolymer (Kraton Polymers Inc., Houston, Tex.) and 30% Engage 8200 ultra low density polyethylene—ULDPE (Dow Chemical Co., Midland, Mich.). A 3.81 cm single screw extruder (8 RPM) was used to supply 3762 polypropylene for the first layer and a 6.35 cm single screw extruder (10 RPM) was used to supply the KRATON/ULDPE blend for the second layer. The barrel temperature profiles of both extruders were approximately the same from a feed zone of 215° C. gradually increasing to 238° C. at the end of the barrels. The melt streams of the two extruders were fed to an ABA three layer coextrusion feedblock (Cloeren Co., Orange, Tex.). The feedblock was mounted onto a 20 cm die equipped with a profiled die lip similar to that shown in FIGS. 12-14. The feedblock and die were maintained at 238° C. The die lip was machined with a repeating sinusoidal wave pattern such that the angle ($\beta$) between two successive channel segments was 67 degrees. The wavelength (W) of the repeating pattern was 1250 microns. The inlet geometry was the same as the outlet geometry for this die lip. This die lip geometry resulted in an extrudate having a discontinuous skin 'A' layer consisting of ribs of polypropylene on a continuous elastic core layer. After being shaped by the die lip, the extrudate was laminated in a nip, set at a gap slightly less than the thickness of the inlet materials, to two layers of nonwoven (31 grams/meter$^2$ carded polypropylene, BBA Nonwovens, Simpsonville, S.C.), one on each side of the extrudate. The laminate was quenched and drawn through a water tank at a speed of 12 meter/min with the water temperature being maintained at approximately 45° C. The web was air dried and collected into a roll. The resulting web was similar to that depicted in FIG. 16.

Example 2

A profiled nonwoven/elastic laminate was produced using a system similar to that shown in FIG. 1. A 40 mm diameter twin screw extruder fitted with a gear pump was used to deliver a molten polypropylene polymer (7C05N, Huntsman) at a melt temperature of approximately 246° C. to a die. The die was positioned such that a film of molten polymer was extruded vertically downward into the interface region of a heated doctor blade (forming tool) 4 and a cooled smooth steel roll 20.

The doctor blade 4 was forced against the smooth roll with a pressure of 93 pounds per lineal inch (163 Newtons per lineal cm) (a pressure which allowed the molten polymer to create a gap 2 between the blade 4 and the roll 20 which defined the thickness of the base film). The doctor blade was maintained at a temperature of 246° C. and the smooth roll was maintained at a temperature of 4° C. by circulating cooled water through the interior of the roll.

The bottom side of the doctor blade 4 (the side facing the smooth roll), was machined to have a series of grooves 7 (5 mm spacing, 0.25 mm deep, 0.98 mm wide) as shown in FIG. 3. The rotation of the smooth roll caused the doctor blade to wipe the molten polymer into a base film layer approximately 75 microns thick having machine direction ridges approximately 120 microns in height corresponding to the grooves in the doctor blade creating a structured extrudate. After the wiping action of the doctor blade, the smooth roll continued to rotate until the structured extrudate was forced into contact with a polypropylene nonwoven substrate (31 grams/meter², BBA Nonwovens, Simpsonville, S.C.) (against a conformable backup roll (with a durometer of 75 Shore A) using a nip pressure of 14 pounds per lineal inch (25 Newtons/lineal cm).

The thick ridges in the extrudate took longer to quench than the thinner continuous base film, and thus the ridges were still sufficiently soft or molten to form a good bond with the nonwoven at the upper surfaces of the ridges. The thinner base film did not bond to the nonwoven. The resulting laminate is shown schematically in FIG. 4.

We claim:

1. A fibrous web laminate comprising;
    a thermoplastic backing having a first face and a second face opposite the first face, the first face comprising at least one thermoplastic resin;
    a plurality of thermoplastic continuous ridges extending from and integral with the first face of the backing and formed at least in part of the thermoplastic resin comprised in the first face of the backing; and
    a continuous fibrous web attached to at least some of the continuous ridges such that said continuous fibrous web penetrates into the thermoplastic resin of the continuous ridges and at least a portion of the continuous fibrous web has a thickness above the top surface of the continuous ridges, wherein the continuous fibrous web extends between at least two adjacent continuous ridges, and wherein the continuous fibrous web is in contact with the backing between at least some of the continuous ridges but is unbonded to the backing between the continuous ridges.

2. The fibrous web laminate of claim 1 wherein the continuous fibrous web penetrates into the continuous ridges and the backing has a thickness of at least 10 microns between the attached continuous ridges.

3. The fibrous web laminate of claim 1 wherein the continuous ridges are integrally formed with the backing by a continuous extrusion process.

4. The fibrous web laminate of claim 1 wherein the continuous ridges are on both the first and second faces of the backing.

5. The fibrous web laminate of claim 1 wherein the continuous ridges are formed of the same polymer as the backing.

6. The fibrous web laminate of claim 1 wherein at least 2 percent up to 30 percent of the area of the backing is occupied by the continuous ridges to which the continuous fibrous web is attached.

7. The fibrous web laminate of claim 6 wherein at most 10 percent of the area of the backing is occupied by the continuous ridges to which the continuous fibrous web is attached.

8. The fibrous web laminate of claim 1 wherein the backing is a continuous film.

9. The fibrous web laminate of claim 1 wherein the continuous ridges are formed at least in part of a polymer different than the thermoplastic resin comprised in the first face of the backing.

10. The fibrous web laminate of claim 9 wherein the backing is formed of an elastomeric polymer.

11. The fibrous web laminate of claim 1 wherein the continuous fibrous web is uncompressed at the continuous ridges where it is bonded.

12. The fibrous web laminate of claim 1 wherein the thickness of the continuous fibrous web at the bonded continuous ridges is at least 50 percent of the thickness of the fibrous web between the continuous ridges.

13. The fibrous web laminate of claim 1 wherein the thickness of the continuous fibrous web at the bonded continuous ridges is at least 90 percent of the thickness of the continuous fibrous web between the continuous ridges.

14. The fibrous web laminate of claim 1 wherein the continuous fibrous web is a knitted or woven material capable of engaging with a hook strip.

15. The fibrous web laminate of claim 1 wherein the continuous fibrous web is a nonwoven web of entangled fibers.

16. The fibrous web laminate of claim 15 wherein the nonwoven web has a basis weight of from 10 to 100 g/m².

17. The fibrous web laminate of claim 16 wherein the nonwoven web has a basis weight of from 10 to 50 g/m².

18. The fibrous web laminate of claim 2 wherein the backing is a continuous thermoplastic film.

19. The fibrous web laminate of claim 2 wherein the backing has a basis weight of from 15 to 150 g/m².

20. The fibrous web laminate of claim 2 wherein the backing has a basis weight of from 20 to 50 g/m².

21. The fibrous web laminate of claim 20 wherein the fibrous web laminate has a basis weight of from 30 to 300 g/m².

22. The fibrous web laminate of claim 20 wherein the fibrous web laminate has a basis weight of from 40 to 100 g/m².

23. The fibrous web laminate of claim 1 wherein the backing film is a thermoplastic elastic material with continuous ridges formed at least in part of an inelastic material.

24. The fibrous web laminate of claim 1 wherein the backing is a coextruded backing with the continuous ridges formed at least in part of a different thermoplastic polymer than thermoplastic resin comprised in the first face of the backing.

25. The fibrous web laminate of claim 2 wherein the backing has a thickness between the continuous ridges of at least 20 microns.

26. The fibrous web laminate of claim 1 wherein the continuous ridges are 0.01 to 0.2 centimeters in their narrowest width dimension.

27. The fibrous web laminate of claim 1 wherein the continuous ridges are all of substantially equal height.

28. The fibrous web laminate of claim 1 wherein the continuous ridges are not of substantially equal height.

29. An elastic fibrous web laminate article comprising a thermoplastic resin backing having a first face and a second face, the thermoplastic resin backing having at least one elastic region and at least one inelastic region, with the elastic and inelastic regions being side-by-side regions of the backing;
    at least one of the elastic region or inelastic region having a plurality of thermoplastic continuous ridges extending from and integral with the first face of the backing and formed at least in part of the thermoplastic resin that comprises the first face of the backing;
    a fibrous web attached to at least some of the continuous ridges such that said fibrous web penetrates into the thermoplastic resin of the continuous ridges, with the fibrous web extending between at least two adjacent continuous ridges, and wherein the fibrous web is in contact with the backing between at least some of the continuous ridges but is unbonded to the backing between the continuous ridges.

30. The elastic fibrous web laminate article of claim 29 wherein the fibrous web penetrates into the continuous ridges and the backing has a thickness of at least 10 microns between the attached continuous ridges.

31. The elastic fibrous web laminate article of claim 29 wherein the elastic region is at least 5 mm wide.

32. The elastic fibrous web laminate article of claim 29 wherein the elastic region is at least 10 mm wide.

33. The elastic fibrous web laminate article of claim 32 wherein the inelastic region has at least one mechanical fastener.

34. The elastic fibrous web laminate article of claim 29 wherein the elastic and inelastic regions are provided on a continuous backing.

35. The elastic fibrous web laminate article of claim 34 wherein the inelastic region is formed of a thermoplastic elastomer continuously bonded to the fibrous web.

36. A fibrous web laminate comprising:
- a thermoplastic backing comprising a thermoplastic resin and having a first face and a second face opposite the first face,
- a plurality of integral thermoplastic continuous ridges extending only from the first face of the backing and formed at least in part of the thermoplastic resin at the first face of the backing; and
- a continuous fibrous web penetrating into the second face of the backing at locations of at least some of the continuous ridges, with the continuous fibrous web extending between at least two adjacent continuous ridge locations, wherein at least a portion of the continuous fibrous web has a thickness above the second face of the backing, and wherein the continuous fibrous web is in contact with the backing between at least some of the continuous ridge locations but is unbonded to the backing between the continuous ridge locations.

* * * * *